Patented Dec. 14, 1948

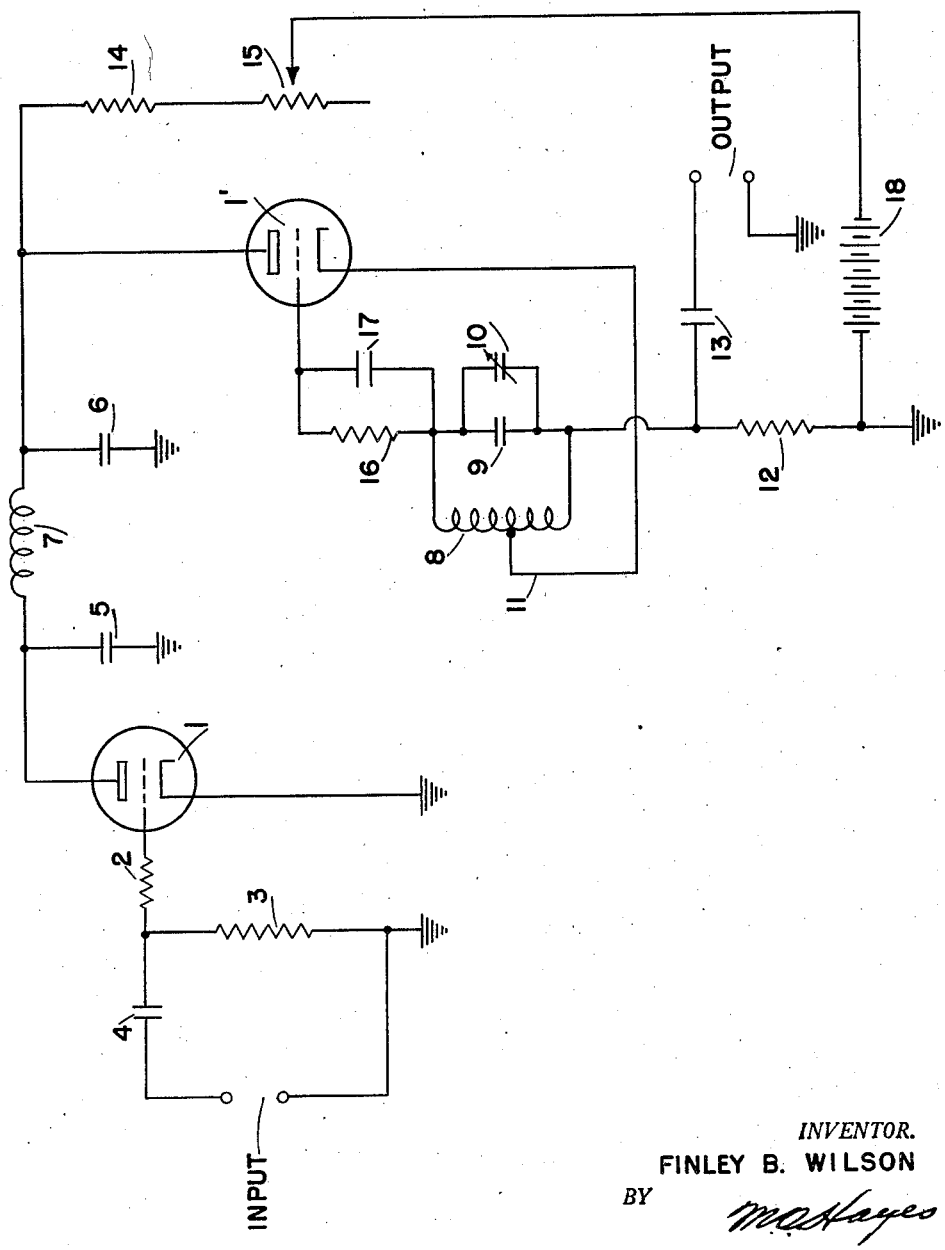

2,456,550

UNITED STATES PATENT OFFICE 2,456,550

KEYED OSCILLATOR

Finley B. Wilson, San Antonio, Tex., assignor to the United States of America as represented by the Secretary of the Navy Application July 16, 1946, Serial No. 684,049

9 Claims. (Cl. 250—36)

1

This invention relates to frequency multipliers and it has special reference to apparatus for multiplying the recurrence rate of a trigger pulse.

A feature of the invention is the use of a free running oscillator and a synchronizing circuit combined to form a pulse repetition frequency multiplying circuit.

Another feature of the invention is its ability to produce stable multiplication of the frequency of an input pulse up to 50 times.

Other features and advantages not specifically enumerated will be apparent after consideration of the following detailed description and of the appended claims.

Referring to the drawing, the single figure is a schematic circuit of the invention.

Referring specifically to the drawing, there is shown the circuit of my invention including two triode vacuum tubes, I and I', which act as synchronizing tube and oscillator tube respectively. Associated with tube I is an input coupling circuit consisting of resistances 2 and 3 and capacitance 4, and artificial storage transmission line in the plate circuit, consisting of capacitances 5 and 6 and inductance 7.

Associated with tube I' is a tuning inductance 8 and two tuning capacitances 9 and 10, said inductance being tapped at 11, condenser 9 being fixed and condenser 10 being variable. Also associated with tube I' is a resistance 12 in series with the negative supply voltage lead, across which the output pulses are developed, a capacitor 13, used to isolate the direct potential drop across resistor 12 from following circuits, a grid leak 16 and grid condenser 17, and a source of anode voltage 18.

Common to both tubes are current limiting resistances 14 and 15, 14 being fixed and 15 being variable for properly adjusting the anode currents of both tubes.

The operation of the circuit is as follows:

Tube I' operates as a conventional Hartley type oscillator, operating under class "C" conditions as determined by the grid leak 16 and condenser 17, which fix the bias on the grid of the tube I'. The length and spacing of the plate current pulses and therefore of the voltage pulses across the output circuit are thus determined by the operating angle of the oscillator, which is in turn, determined by the combination 16 and 17. The recurrence rate of these pulses under free running conditions is determined by the values of inductance 8 and capacitances 9 and 10.

The shape of the voltage pulses across the output circuit resistance 12 is determined by the condenser 6 which has a tendency to charge up to the full voltage of the source of voltage 18 through resistances 14 and 15. Whenever the tube I' becomes more conductive at the peak of each pulse as the tube oscillates, the condenser 6 discharges slightly thereby tending to produce a sharp pulse across the resistance 12 for each oscillation of tube I'.

At the same time that the condenser 6 is being charged from source 18, the condenser 5, which is of smaller capacity, is likewise charged from source 18 through inductance 7. However, because of the impedance of inductance 7, condenser 5 discharges only slightly through tube I' when the latter becomes more conductive so that condenser 5 tends to maintain the plate voltage impressed on tube I at nearly the voltage of the source 18 whereby tube I will saturate rapidly and assume its lowest resistance value when its grid is triggered by a positive triggering pulse. When a triggering pulse is applied, the condenser 5 is immediately discharged as the tube I acts as a short-circuit thereacross. The higher capacity condenser 6 also is discharged by the tube I, the inductance 7 limiting the discharge current to a value which can be safely handled by tube I. The discharge of condenser 6 rapidly reduces the voltage impressed on the plate of tube I' so that the oscillator is rendered inoperative for an instant. However, the rapid recharge of condenser 6 from the source 18 through the resistors 14 and 15 immediately restarts the oscillator and, as each restart will always occur at the same voltage, this has the effect of synchronizing the oscillator with the triggering pulses applied to tube I by shifting the frequency of the oscillator into synchronism with the triggering pulses. The pulses developed across resistance 12 will likewise be in synchronism with the triggering pulses but will, of course, have a rate which is a multiple of the triggering pulse frequency so that the apparatus will therefore perform as a pulse repetition frequency multiplying circuit.

It is to be understood that, while I have described my invention in certain preferred embodiments, I do not desire to limit the scope of my invention except as it may be limited by the scope of the appended claims.

Having described my invention, I claim:

1. An electronic device for the generation of pulses at a frequency harmonically related to a trigger pulse frequency comprising, a free running inductance capacity oscillator including a vacuum tube having a plate and a cathode, a source of voltage having its positive terminal connected to said plate, a resistance connected between the cathode and the negative terminal of said source, output terminals connected to the ends of said resistance, and means responsive to a trigger pulse for rendering said oscillator inoperative for a predetermined interval whereby the oscillator will commence to oscillate at a predetermined time relative to initiation of the trigger pulse.

2. The device of claim 1 in which said means for rendering the oscillator inoperative reduces the voltage applied to the plate of the tube to a value which inhibits oscillation.

3. The device of claim 1 in which said means for rendering the oscillator inoperative includes a second tube for shunting the oscillator in response to a trigger pulse.

4. The device of claim 1 in which said means for rendering the oscillator inoperative includes a condenser connected across the plate of the tube and the negative terminal of the source, and a second tube for discharging said condenser in response to a trigger pulse.

5. The device of claim 1 in which said means for rendering the oscillator inoperative includes a condenser connected across the plate of the tube and the negative terminal of the source, a resistance between the plate and the positive terminal of the source, and a second tube for discharging said condenser in response to a trigger pulse.

6. The device of claim 1 in which said means for rendering the oscillator inoperative includes a second tube for shunting the oscillator in response to a trigger pulse, and means associated with the oscillator for varying its frequency.

7. The device of claim 1 in which said means for rendering the oscillator inoperative includes a first condenser connected across the plate of the tube and the negative terminal of the source, a second condenser and an impedance in series therewith connected in parallel with said first condenser, a resistance between the plate and the positive terminal of said source, and a second tube for discharging said condersers in response to a trigger pulse.

8. The device of claim 7 having means associated with the oscillator for varying its frequency.

9. The device of claim 7 in which said resistance is adjustable.

FINLEY B. WILSON.

No references cited.